May 22, 1951 — M. E. TRUE — 2,553,613
APPARATUS FOR MEASURING AND RECORDING LENGTHS
Filed April 9, 1948 — 4 Sheets-Sheet 1

Martin E. True, INVENTOR.

BY J. C. Small
ATTORNEY.

May 22, 1951 M. E. TRUE 2,553,613
APPARATUS FOR MEASURING AND RECORDING LENGTHS
Filed April 9, 1948 4 Sheets-Sheet 2

Martin E. True, INVENTOR.

BY

ATTORNEY.

May 22, 1951  M. E. TRUE  2,553,613
APPARATUS FOR MEASURING AND RECORDING LENGTHS
Filed April 9, 1948  4 Sheets-Sheet 3
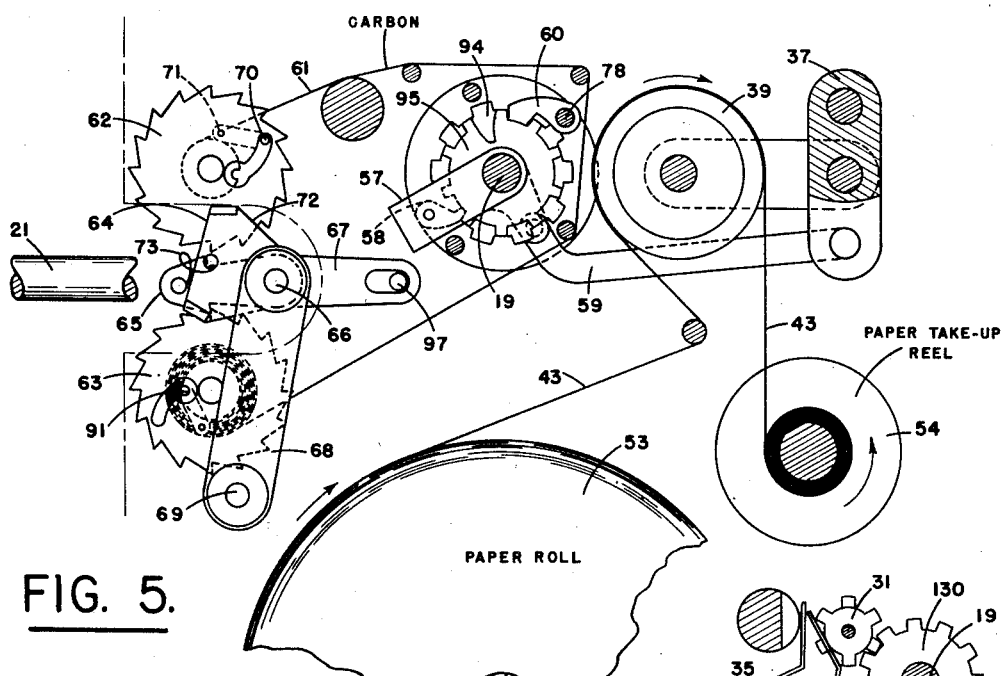
FIG. 5.
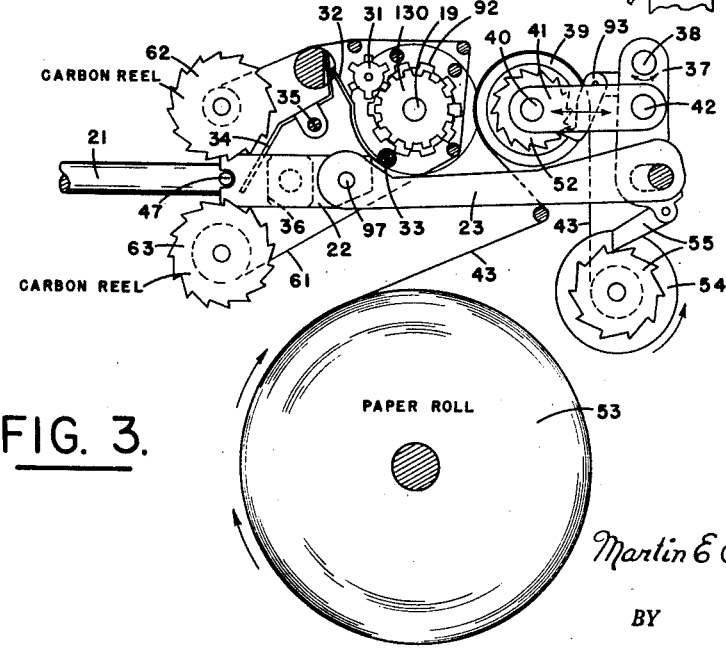
FIG. 3A.
FIG. 3.
Martin E. True, INVENTOR.
BY
ATTORNEY.

May 22, 1951
M. E. TRUE
2,553,613
APPARATUS FOR MEASURING AND RECORDING LENGTHS
Filed April 9, 1948
4 Sheets-Sheet 4
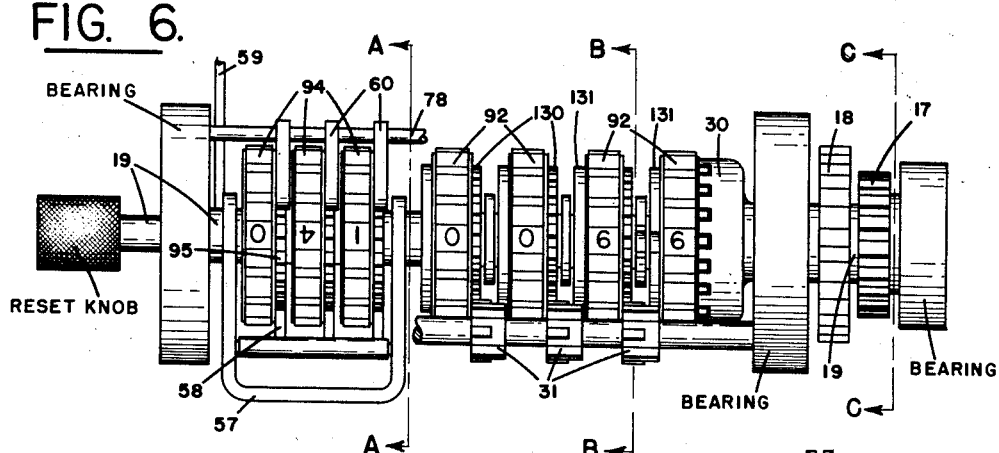
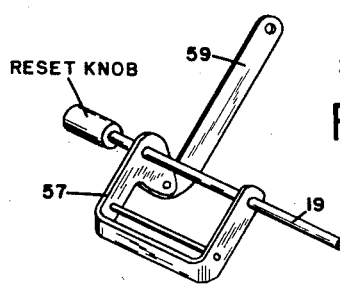
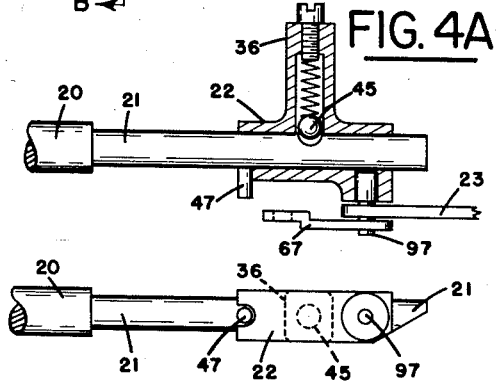
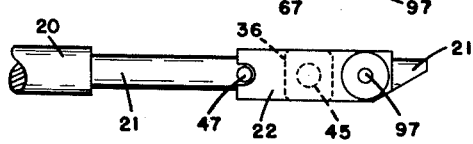
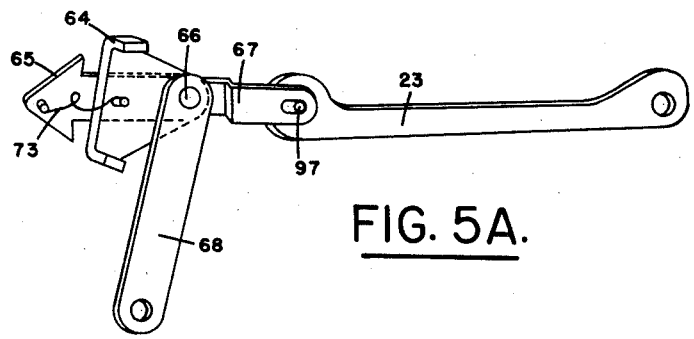
Martin E. True, INVENTOR.
BY
ATTORNEY.

Patented May 22, 1951

2,553,613

UNITED STATES PATENT OFFICE 2,553,613

APPARATUS FOR MEASURING AND RECORDING LENGTHS

Martin E. True, Houston, Tex., assignor, by mesne assignments, to Standard Oil Development Company, Elizabeth, N. J., a corporation of Delaware Application April 9, 1948, Serial No. 19,954

3 Claims. (Cl. 33—139)

The present invention is directed to an apparatus for measuring and recording lengths. The modification of this apparatus particularly described herein is a portable indicating and recording device which determines lengths by means of a measuring tape and is particularly adapted for use in the rapid and accurate determination of lengths of pieces of pipe, such as the drill pipe employed in drilling wells.

In many operations, it is important to measure accurately the length of structural members. For example, in the drilling of oil wells it is desirable that the depth or length of the well be accurately known throughout the drilling operation and to this end it is necessary to measure accurately the length of each piece of drill pipe employed. The usual lengths of drill pipe used in such operations are about thirty feet. These are known as "singles" and in drilling operations it is usual to connect three such pipe lengths together for handling to produce a length of about ninety feet known as a "tribble." Thus in wells of 10,000 feet in depth over 100 tribbles must be employed to make up the drill stem used in drilling and completing a well. Variations in the range of two or three feet in the length of the tribble are common. When it is considered that some oil producing formations may be only ten feet in thickness, the necessity of accurate measurement of the drill pipe in use becomes readily apparent. Since this pipe must be measured in relatively small lengths, such as singles or tribbles, and the total length determined only as the sum of the numerous individual measurements, the opportunity for a serious error is greatly enhanced.

The accuracy in general of such measurements of well drilling or other tubular material used in drilling and completing oil wells as obtained with a standard derrick steel measuring tape, is a function as variable as the personnel reading and recording the measurements and the climatic conditions under which this is done. For example, errors are most likely to be made by drilling crews in reading and recording measurements of drill pipe casing or tubing on the pipe rack or in the derrick at night or in bad weather. Such errors result from misreading of the tape, misunderstanding of the measurements called out and transcription of numerals or other incorrect recordings in the written record. Moreover, the work of drilling wells, especially oil wells, is a dirty job since the drilling operation is controlled by circulating mud. Quantities of oil, mud and other chemicals may be present in and on the pipe which periodically is brought out of the hole for changing bits or for other reasons which may be desirable. It may readily be seen from the foregoing that the measurement of the pipe using the usual measuring table is subject to many errors which may be economically disastrous especially when a valuable producing formation may be missed.

It is therefore a principal object of the present invention to provide a device which will allow a length of pipe to be measured accurately and rapidly and recorded without being subject to human error. The present invention is illustrated by a preferred embodiment which may be described briefly as a portable housing having an enclosed reel which carries a 100 foot perforated measuring tape which drives a metering wheel equipped with lugs to mesh with the perforations in the tape, means driven by the measuring wheel to actuate a recording counter, a reference shoulder on the housing to provide a zero point for measurements and a second reference marker or shoulder attached to the end of the measuring tape. The recording counter includes a printing mechanism to record the length of each measurement made with the device and a second printing counter mechanism for the purpose of recording the number of measurements taken in any one series, provision being made for recording both the length and the number of the measurement simultaneously on a printed tape and for automatically resetting the mechanism for further measurements.

These and further objects of the present invention will be understood by reference to the drawings in which Fig. 1 is a front elevation in partial section of one embodiment of the device;

Fig. 3 is a partial sectional view of a portion of the printing mechanism;

Fig. 3A is an enlarged view of the alignment device for the printing wheels of the counter;

Figs. 4A and 4B are detailed plan and elevation views of the trigger escape joint mechanism;

Fig. 5 is a section view of the metering device illustrating the counter wheel advancing mechanism and the inked ribbon supply. The counter wheel portion of this figure is a sectional view A—A of Fig. 6;

Fig. 5A is a detail feature of the ribbon reversing toggle of Fig. 5;

Fig. 6 is a plan view of the measuring and counting units;

Fig. 6A is a perspective view of a gear element of Fig. 6, and Fig. 6B is a perspective view of the linkage for operating the counting unit.

Figure 2:
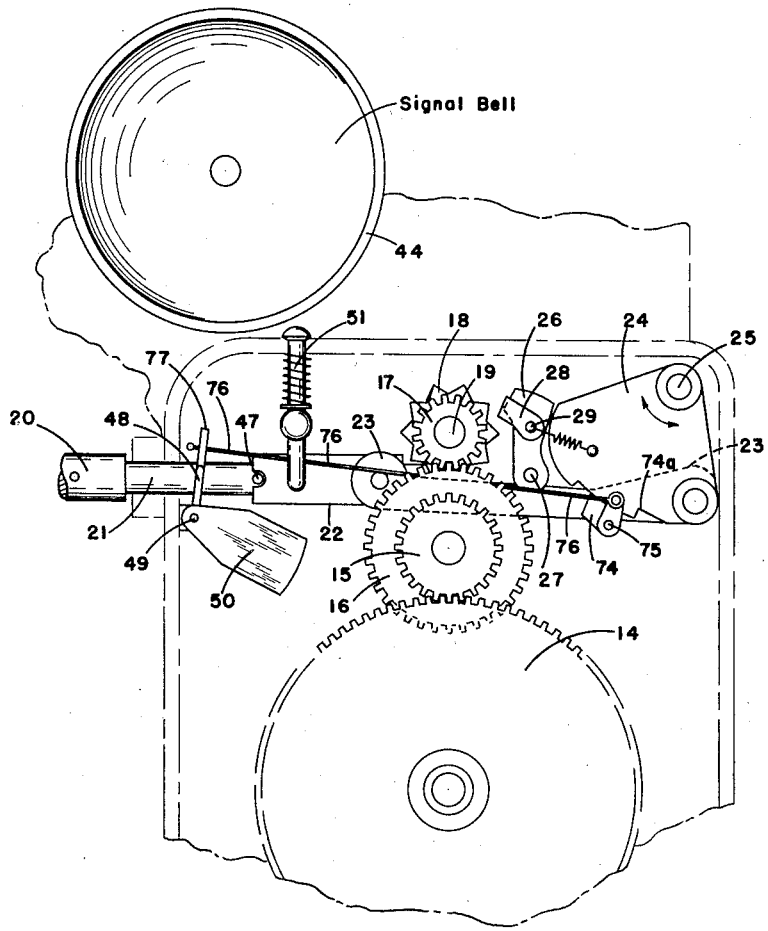
Fig. 2 is an interior section of the metering device illustrating the measuring tape gear train, the locking and expansible linkages connecting with the trigger mechanism, and the alignment device for the printing wheel of the length measuring unit.

Sections A—A, B—B, and C—C of Fig. 6 are illustrated respectively in Figs. 5, 3 and 2.

Similar numbers represent similar parts throughout the several figures of the drawings.

Figure 1:
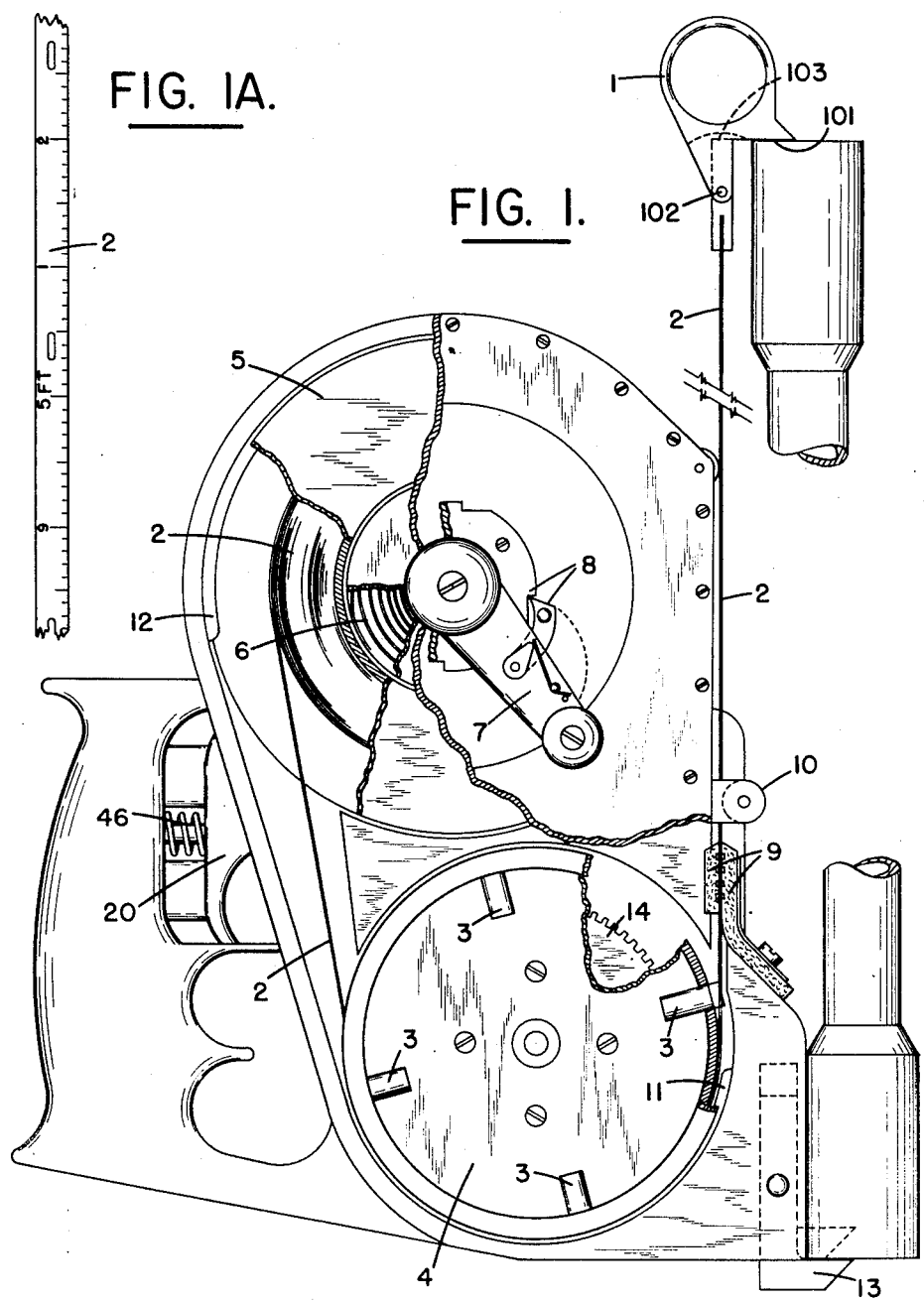
Fig. 1A is a plan view of the perforated steel tape.

Referring now to the drawing in detail, the steel measuring tape 24, Fig. 1, is the conventional type except with perforations along its center to engage the metering wheel sprocket teeth 3. The tape is pulled out the desired length by the ring 1, turning the metering wheel 4 as it unwinds from the tape reel 5. The hub in the tape reel houses a flat-wound spring 6. The tape reel is driven by the crank 7 through this flat-wound spring. The crank can be locked in any one of several positions, as shown, by means of the ratchet and dog 8. When so locked and the tape is pulled out farther, a torque is built up in the flat-wound spring, thus putting a tension on the reeled-off measuring tape. This permits taking successive measurements which are within the travel allowed by the flat-wound spring without further adjustment of the crank. The dog can be disengaged for free unwinding of the measuring tape by toggling the dog to its other position near the crank handle.

Wipers 9 wipe off the tape and seal the opening as the tape is wound into the case. Guide roller 10 assures proper tape approach to the wipers and metering wheel.

Rail 11 on the housing insures proper meshing of the tape with the metering wheel sprocket teeth, and a similar rail 12 for the tape reel keeps the tape within its flanges.

Reference shoulder 13 has a plunger action and slides within the protruding part of the housing to its two positions, one shown in solid lines and the other in dotted lines. In either case, the measurement is taken from the same reference line, which is the bottom edge of the housing, thus permitting measurements to be taken either from a flat surface or a shoulder. A set screw is preferably provided for locking the reference shoulder in either position. The ring end 1 of the tape is provided with a shoulder 101 for taking measurements from shoulders such as a pipe end or the ring may be turned on pivots 102 to permit measurement against a flat surface by tape end 103.

Metering pulley 4 is keyed to the same shaft as gear 14, Fig. 2, which in turn drives gears 15, 16 and 17 making up a gear train with the proper ratio to drive the shaft 19 on which is keyed the star wheel 18 and the driving gear 30 of the first measuring wheel 92, Fig. 6.

When the tape has been pulled out to the distance to be measured, the star wheel 18 and measuring wheel 92 stop rotating. At this point in taking the measurement, the trigger 20 (Fig. 1) is pulled. One pull of the trigger and its return by spring 46 complete all subsequent operations for taking any one measurement and putting the instrument in readiness for the next measurement.

The pull exerted on the trigger is transmitted through pull rod 21, the escapement joint 22 (shown in detail in Figs. 4A and 4B), and platen pull link 23 to bell crank 24. Cam action of the bell crank rotating about shaft 25, which is mounted in the housing, pushes indexing pawl 26 into engagement with star wheel 18. Each of the teeth of this star wheel, when engaged by the indexing pawl rotating on shaft 27 (also mounted in the housing), positions one of the ten numerals engraved on the first measuring wheel 92 into alignment for printing. The outline of the tooth on the indexing pawl 26 is the same as between teeth on the star wheel. When the indexing pawl tooth is made to fully mesh with the star wheel by the cam or bell crank 24 then the first counter wheel is properly aligned. Should there be a slight misalignment between a star wheel tooth and the indexing pawl tooth the force applied by the cam of the bell crank assures full mesh by forcing the star wheel forward or back the necessary slight amount. The function of safety lug 28 is to prevent a "dead center" contact should the star wheel come to rest midway between two printing positions in such a manner that the tooth point of the indexing pawl would contact the tooth point of the star wheel and prevent meshing. The outline of the face of the tooth on the safety lug 28 is the same as for the tooth on the indexing pawl proper and, when fully meshed with star wheel, will coincide with it. The safety lug is free to move on its pin 29 which is set in the pawl 26. As the indexing pawl 26 advances to engage star wheel 18 the point of the safety lug tooth 28 leads the point of the indexing pawl tooth 26 and follows a slightly different path about pin 27. Therefore, if the point of the indexing pawl tooth is about to contact a star wheel tooth point, the safety lug tooth will miss the "dead center" by a small amount and by leading the indexing pawl tooth will rotate the star wheel just enough to prevent interference and allow proper meshing, thus assuring alignment of the first measuring wheel for printing.

The measuring counter is a conventional reversible type indicator, adding in one direction and subtracting in the other, with a number of measuring and printing indicator wheels, each driving the next adjacent wheel through a single tooth gear 131, fixed to the measuring wheel, a transfer gear 31 and a gear 130 which rotates the adjacent driven wheel a fraction of the revolution of the driving wheel. In the device illustrated the measuring wheels are designed for the decimal system to indicate feet in hundredth, tenths, units and tens on four wheels. Additional wheels can, of course, be added if a smaller fraction or a longer tape is desired. As indicated above and in Fig. 6, the first measuring wheel 92 is driven from the shaft 19 through crown gear 30 keyed to the shaft, the measuring wheels 92 being rotably mounted on the shaft. As this first measuring wheel is brought into alignment by the star wheel 18 the succeeding measuring wheels are brought into partial alignment at the same time. However, due to the slack between the gears 130, 31 and 131 for each pair of measuring wheels their alignment is not sufficiently close for printing. To obtain proper alignment, an aligning rake 32, is provided and is pivoted on the pin 33, as shown in Fig. 3. The rake has one tine for each transfer gear in the measuring counter, only one of each being shown in Fig. 3. The transfer gears 31 have a portion cut out of alternate teeth as shown in Fig. 6A. The flat tine is brought into contact with two alternate teeth of the transfer gear 31 and as force is applied, it will rotate the transfer gear and the gear 130 to a predetermined position which in turn rotates its associated measuring wheel to alignment, as shown in Fig. 3A. This arrangement will take care of considerable misalignment of the measuring wheels and therefore allow the simultaneous alignment of all wheels. The aligning force on the rake 32 is supplied through rocker 34, pivoted on pin 35, by the shoulder at 36 on escapement joint 22 as it moves with the trigger pull, rotating the tail of rocker 34 about pivot 35. The play between the shoulder at 36 and the tail piece of rocker 34 prevents the rake from engaging the transfer gears before the counter has stopped rotating and is locked by the star wheel 18 and pawl 26.

The printing mechanism will now be described, with reference to Figs. 3 and 5. As the trigger 20 is pulled farther back, rocker arm 37 rotates about shaft 38 (mounted in the housing) and moves platen 39 to contact opposed printing faces of the measuring wheels 92. Platen shaft 40 is moved in straight guide slots (not shown) in the frame by two links 41 on each end which are pinned to rocker arm 37 at 42. As further pressure is applied on the trigger, the required pressure to print is applied on the paper tape 43 which rolls over rubber platen 39. Escapement joint 22 releases after the required pressure is applied and at this moment the bell 44 rings signaling that the reading has been printed.

Just as the platen is about to contact the printing wheels, the various ratchets engage their respective ratchet wheels on the numbering counter (yet to be described), the platen roller and inked ribbon spool. Should the trigger pressure be released slightly and any recession permitted in the mechanism, the numbering counter and platen roller are advanced, either partially or completely, without first having printed. In either case it would ruin the continuity in the measurements being taken. A safety measure is taken to prevent this. As bell crank 24, Fig. 2 is advanced to this critical point by the pull of the trigger, safety pawl 74, pivoted at 75 in the housing, drops into ratchet tooth 74a on bell crank 24. This prevents any recession in its forward travel. Safety pawl 74 remains engaged until the forward printing stroke is completed as signified by the ring of the bell. Arm 77, rigidly connected through pivoted shaft 49 to bell hammer 50, strikes safety pawl pull link 76 and disengages the safety pawl as the hammer advances to sound the bell. The operation of shaft 49 is described as follows:

Fig. 4A shows a section taken through the escapement joint 22. The pull exerted on trigger pull rod 21 is transmitted through the steel ball 45, which is spring loaded into the groove in rod 21, to the joint body 22 and link 23 on the back to the rocker arm 37 (of Fig. 3). When more than the "required" pull is exerted, ball 45 is forced from the groove against the spring pressure and pull rod 21 is released to slide in joint body 22. The joint will remain in the elongated condition until spring 46 (Fig. 1) returns the trigger and other mechanism to the end of the return stroke, where the ball drops back into the groove in pull rod 21. The steel ball releases the pull rod 21 instantly and the rod travels the remainder of its movement rapidly. Referring again to Fig. 2, the pin 47 in pull rod 21, thus sharply strikes arm 48 rigidly mounted on shaft 49, thereby swinging hammer head 50 which strikes plunger rod 51 which in turn strikes and sounds bell 44.

Platen 39, Fig. 3, is rotated one spacing on the return stroke by the pawl 93 and ratchet 52 advancing the tape from paper roll 53 to receiving spool 54. Shaft 40 extends through the case and is also fitted with a knob for manually advancing the tape. On each forward stroke of the trigger the ratchet and pawl 55 wind up the printed tape on receiving spool 54 through a drag clutch between the ratchet wheel and spool, thus keeping all slack out of the printed tape. The clutch also permits reversing rotation of the receiving spool 54 to unwind printed tape from it without first disengaging pawl 55. Instead of feeding the paper tape on the spool 54 it may be passed out of the instrument and cut or torn off as desired. Also, the printed tape stored on spool 54 during a series of measurements may be unwound, torn off and preserved as a printed record of the measurements taken.

A numbering counter of a customary ratchet, non-reversing type is provided to indicate the number of consecutive operations of the printing mechanism, advancing one unit for each complete cycle of the trigger operation. Any desired number of wheels may be used, the counter illustrated in Figs. 5 and 6 having three counting wheels 94 indicating units, tens and hundreds of operations. The face of each wheel carries type numerals for printing. Attached to each counter wheel is a ratchet 95. These counter wheels are mounted rotatably on the same shaft 19 as the other measuring wheels 92. The advancing arm 57, carrying pawl 58 for each counter wheel ratchet 95, pivots on shaft 19 and is actuated by link 59 from rocker arm 37 as shown in Fig. 5. A spring loaded detent or click 60 for each counter wheel ratchet 95 is pivoted on tie pin 78 to engage the ratchet when it is advanced and to hold it in alignment for printing. The counter is advanced one count with each return stroke of the mechanism by engagement of pawl 58 with the teeth of ratchet 95. Shaft 19 is extended through the case with a knurled knob to reset the counter to zero.

An inked ribbon 61 (Figs. 3 and 5), passing between the measuring and counting printing wheels and the rubber platen, carries the ink for printing and is wide enough to supply all wheels 92 and 94. The inked ribbon is fed in front of the printing wheels by the two spools on ratchet wheels 62 and 63, advancing from one to the other and then reversing. The toggle parts 64 and 65, shown in Figs. 5 and 5A, are both pivoted on pin 66 and energized by expansion spring 73; these reverse the rotation of the spools by causing ratchet 65 to engage first one ratchet wheel and then the other. The reciprocating motion for the ratchet is supplied from the escapement joint 22 through link 67. Link 68 pivoted at 69 carries pin 66 for the toggle thus supporting and approximating straight line motion for it. As ratchet wheel 63 is driven forward by ratchet 65, in the position shown in Fig. 5, the inked ribbon is unwound from the spool on the upper ratchet wheel 62. Pin 70, which runs parallel to the hub of the ribbon spool and is pivoted at 71, is held down on the hub by the ribbon when wound onto the spool as shown for pin 91 in the lower spool 63. This pin projects through slots in the ribbon spool flange and in the ratchet 62. As the last layer of ribbon is unwound from the upper spool 62, pin 70 is released to move outward into the position shown in Fig. 5. Pin 70 then rotates with ratchet wheel 62 until it contacts part 64 of the toggle at point 72, rotating it about pin 66 and thus toggling ratchet 65 to its alternate position to engage ratchet 62 and to reverse the rotation of the spools.

While a specific modification of the present invention has been described above for purposes of illustration, it will be recognized that many variations may be made in the various parts of this device without departing from the spirit of this invention. For example, the inked ribbon mechanism may be entirely omitted if provision such as an ink fountain and roller are provided for inking the printing surfaces. Alternatively a one-time carbon may be rolled with the paper to be printed, the printed record then appearing on the opposite side of the paper. As another alternative, a narrow inked ribbon or a one-time carbon paper ribbon may be passed axially across the face of the characters to be printed. The numbering wheels 94 and their associated parts may be omitted if it is desired to simplify the device merely for indicating and recording distances measured. As a further simplification, the printing mechanism may be entirely dispensed with and the device used merely to indicate the distances measured in a single operation.

Field tests have been conducted with the recording pipe measuring tape described above and illustrated in detail in the drawings. Drill pipe on a rack were measured first with the usual derrick tape, preparing a hand-written record following each measurement. The same pipes were then measured with the recording tape instrument. Despite unusual care in making the measurements with the derrick tape, a total of 14 errors was made which had to be corrected by rechecking before the totals shown below were obtained. These errors, which are common ones, were the result of misreading the tape, transposing figures, both in reading and recording, or recording the figures wrong. The measurements made with the recording tape involved no errors and were made very quickly, a time check indicating that the recording tape can be used to measure 100 joints of drill pipe on the rack in twelve minutes. The results of these measurements are given in the following table:

| Number of Pipes | Derrick Tape Measurements | First Recording Tape Measurements | Second Recording Tape Measurements |
|---|---|---|---|
| | Feet | Feet | Feet |
| 104 | 3,168.04 | 3,167.83 | 3,167.95 |
| 122 | 3,771.81 | 3,771.66 | |

It is apparent by comparing the first and second series of recording tape measurements that a very close check was obtained thus indicating the high degree of accuracy provided by this instrument.

I claim:

1. In a device for measuring distance, including a housing, and contained therein a reel mounted measuring tape, withdrawable from the reel and housing to measure distance with reference to said housing, measured distance and measurement sequence registering means mounted in said housing, including a shaft and a series of distance and sequence registering elements rotatable thereon, and means for rotating said shaft, and serially rotating said elements, driven by withdrawal of the tape from the reel and housing when measuring distance; apparatus for recording measurements and the sequence thereof as registered by rotation of said elements, comprising a manually operable trigger mechanism mounted for reciprocal movement in said housing, operating means for aligning and fixing the aligned position of said shaft and one of the series of distance registering elements, operating means for aligning and fixing the position of the remainder of said elements, operating means for rotating said sequence registering elements and for fixing their position after rotation, operating means for passing a recording tape through said housing, operating means for positioning the recording tape for impressed contact with said registering elements, and for bringing said recording tape and registering elements into impressed recording contact one with another, the recording tape serially to receive a sequence of impressions from said registering elements, and actuating means for said several operating means engageable between said operating means and the trigger mechanism, said operating means severally and jointly operable through said actuating means by reciprocal movement of said trigger mechanism in the housing.

2. A device according to claim 1, in which said trigger mechanism comprises, a hand grip member secured exteriorly to said housing, a spring loaded trigger mounted in said grip for reciprocal movement with reference to the housing, a trigger rod, having an outer end secured to said trigger and extending therefrom into the housing, and an inner end within the housing, said rod being movable in a reciprocal stroke outward and inward through the housing, a trigger rod escapement joint interiorly of the housing adapted to slideably receive the inner end of said rod, spring loaded means in said joint engageable with the inner end of said rod to automatically release the rod at a predetermined point during its outward stroke, and means carried by said joint engageable with said actuating means to actuate said several operating means by reciprocal movement of the trigger and trigger rod.

3. A device according to claim 1, in which the operating means for intermittently passing said recording tape over said series of distance and sequence registering elements, for positioning the tape with reference to said elements serially to receive successive impressions therefrom, and for bringing said tape and elements into impressed contact one with another, comprises a tape engaging platen disposed in substantially opposed, parallel, co-extensive relation to said registering elements in said housing, means for passing a recording tape over said platen in surface engagement therewith, between said platen and elements, a shaft supporting said platen in the housing, said shaft and platen mounted therein for straight-line reciprocal movement into and away from contact with said registering elements with said tape impressed between them, a rocker arm pivotally mounted at one end in said housing with its other end free for arcuately reciprocal motion toward and away from said registering elements, link members each pivoted at one end on said shaft and at the other end to said rocker arm intermediate its pivotal mounting and its other end, a ratchet wheel secured to said platen concentrically of the shaft, a pawl, engaging said wheel, mounted on said arm and movable therewith to rotate said wheel and platen, and means for supplying a tape for engagement by said platen, said rocker arm pivotally connected directly to said actuating means including said trigger mechanism and reciprocally movable thereby.

MARTIN E. TRUE.

REFERENCES CITED

The following references are of record in the file of this patent:

UNITED STATES PATENTS

| Number | Name | Date |
| --- | --- | --- |
| 748,094 | Parker | Dec. 29, 1903 |
| 1,237,808 | Ottinger | Aug. 21, 1917 |
| 1,560,392 | Mager | Nov. 3, 1925 |
| 2,448,965 | Drayer | Sept. 7, 1948 |

FOREIGN PATENTS

| Number | Country | Date |
| --- | --- | --- |
| 50,426 | Norway | Aug. 14, 1933 |